United States Patent [19]

Boone et al.

[11] Patent Number: 5,712,483

[45] Date of Patent: Jan. 27, 1998

[54] X-RAY GRID-DETECTOR APPARATUS

[75] Inventors: John M. Boone, Folsom; Stephen M. Lane, Oakland, both of Calif.

[73] Assignee: The Regents of the University of California, Oakland, Calif.

[21] Appl. No.: 672,633

[22] Filed: Jun. 28, 1996

[51] Int. Cl.⁶ ..................................................... G01T 1/20
[52] U.S. Cl. ...................... 250/367; 250/368; 250/486.1; 250/487.1
[58] Field of Search ..................................... 250/366, 367, 250/368, 363.1, 370.11, 483.1, 486.1, 485.1, 487.1

[56] References Cited

U.S. PATENT DOCUMENTS

| 3,026,412 | 3/1962 | Carlson | 250/367 |
| 3,048,698 | 8/1962 | Carlson | 250/367 X |
| 5,455,849 | 10/1995 | Logan et al. | |

FOREIGN PATENT DOCUMENTS

| 58-169078 | 10/1983 | Japan | 250/363.1 |
| 3-115989 | 5/1991 | Japan | 250/363.1 |
| 5-100035 | 4/1993 | Japan | 250/367 |
| 2034148 | 5/1980 | United Kingdom | 250/363.1 |

OTHER PUBLICATIONS

Fahrig et al., "Performance of Glass Fiber Antiscatter Devices at Mammographic Energies", Med. Phys. 21 (8), Aug. 1994, Am. Assoc. Phys. Med., pp. 1277–1282.

Primary Examiner—Edward J. Glick
Attorney, Agent, or Firm—John P. O'Banion

[57] ABSTRACT

A hybrid grid-detector apparatus for x-ray systems wherein a microchannel plate structure has an air-interspaced grid portion and a phosphor/optical fluid-filled grid portion. The grids are defined by multiple adjacent channels separated by lead-glass septa. X-rays entering the air-interspaced grid portion at an angle of impingement upon the septa are attenuated, while non-impinging x-rays pass through to the phosphor/fluid filled portion. X-ray energy is converted to luminescent energy in the phosphor/fluid filled portion and the resultant beams of light are directed out of the phosphor/optical fluid filled portion to an imaging device.

28 Claims, 7 Drawing Sheets

X-RAY GRID-DETECTOR APPARATUS

BACKGROUND OF THE INVENTION

1. Field of the Invention

This invention pertains generally to x-ray imaging, and more particularly to a grid-detector apparatus for digital radiography which improves imaging performance of the digital radiographic system.

2. Description of the Background Art

X-ray detection for the purpose of industrial and medical imaging typically makes use of a conventional screen-film system, where generally radiographic film is housed in a light tight cassette and is surrounded on both sides with x-ray intensifying screens. The x-ray intensifying screens are composed primarily of a chemical compound such as Gadolinium Oxisulfide (doped with terbium) which is a scintillator, which means that it emits light when struck by x-rays or energetic particles. When the x-rays are incident upon the cassette, they mostly interact with the scintillator in the intensifying screen, which in turn emits visible light energy which is then detected by the film. After chemical processing, the film demonstrates an image of the object being radiographed. A cassette such as described that use two screens with double-sided emulsion in between is typically referred to as a "par" cassette.

For purposes of mammography, however, a higher resolution cassette than a "par" cassette used for general radiography is typically required. Therefore, "detail" cassettes have been developed which typically use one screen and one emulsion layer. While, higher spatial resolution achieved as compared to a "par" cassette, but absorption efficiency is sacrificed. Because it is desired to detect as many of the x-rays passing through the patient as possible to avoid over-irradiating the patient, there is a need for a detection medium that provides both high spatial resolution and high absorption efficiency.

While analog x-ray film has been used with success for 100 years, the requirements of the increasingly digital environment used in industry and in medicine are presently pushing radiographic imaging to become computerized. Not only do digital images provide the means for electronically viewing, archiving, and sending images, but advances in computer software have made available computer programs which are able to assist in the interpretation of the images. For medical images, this so-called computer aided diagnosis in combination with the human observer has led to improvements in the diagnostic potential of the medical imaging examination, over and above what the imaging expert can provide on his or her own.

As a result, there are several new classes of detector systems for direct digital imaging, where no film is used. Direct x-ray detectors measure the electronic charge distribution that results from x-ray interaction in the detector system, and new amorphous selenium detector systems are an example of this. In contrast, indirect x-ray detector systems make use of an x-ray scintillator, which is a chemical compound that emits visible light (or ultraviolet or infrared light, depending on the compound) when it is struck by a beam of x-rays. The visible light is then detected by an imaging device. Conventional radiography using a screen-film cassette makes use of the indirect method for image production.

When the light sensor (photodetector) is a digital camera, it is possible to produce digital images directly using a scintillator coupled to the photodetector. Current examples of digital cameras include charge coupled devices (CCD), complementary metal oxide semiconductor (CMOS) cameras, and amorphous silicon photodiode arrays. When producing images with x-rays, it is preferable to maximize both the absorption of the x-rays in the detector, and also to maximize the conversion of that absorbed x-ray energy into a usable signal. Absorption efficiency can be improved by increasing the physical thickness of the detector, but with conventional x-ray intensifying screens this leads to an undesirable loss of spatial resolution because the light emitted within the screen spreads out before it reaches the imaging surface of the screen.

Therefore, there is a need for an x-ray detection apparatus that provides both high absorption efficiency and high spatial resolution. The present invention satisfies those needs, as well as others, and overcomes the deficiencies found in current x-ray systems.

SUMMARY OF THE INVENTION

The present invention pertains generally to an apparatus that produces more light photons at a given x-ray exposure level than with conventional systems and, further, that improves the scatter rejection capabilities of the system.

By way of example, and not of limitation, the invention increases the efficiency of x-ray absorption, or detection efficiency, by using an efficient air interspaced grid design and thick x-ray absorbing phosphor. The phosphor is housed in very small light channeling pores of a microchannel plate (MCP), which provide for only minimal lateral light spread while maintaining spatial resolution even with substantially thicker phosphor layers than are normally used. Furthermore, instead of using a light-attenuating binder as in traditional screens, the phosphor crystals are tightly packed into the pores of the MCP, and the pores are then filed with optical fluid. The fluid has an index of refraction matched to the extent possible to that of the phosphor crystals so as to substantially reduce optical scattering interfaces and improve light output.

In use, the invention is typically positioned between the patient's anatomy and the photosensitive digital camera, such as a CCD, CMOS camera, an amorphous silicon photodiode, or even analog film.

The present invention provides for higher effective conversion efficiency as well as higher x-ray detection efficiency than in conventional systems and can be used for both general radiography and mammography. The result is a significant improvement in image quality in terms of both the modulation transfer function (MTF) and the detective quantum efficiency (DQE). These parameters relate directly to the detectability of subtle objects such as early breast cancers in mammography or small pulmonary nodules in chest radiography. The MTF improvements will directly influence and improve the ability not only to detect, but also to classify the shape of small microcalcifications in mammography, which is an important factor in increasing specificity of the mammography examination. The improvements in DQE directly correlate with the low contrast detectability performance of the imaging system. Consequently, for small, low contrast breast carcinomas, an improved DQE results in the cancer being more visible compared to the noise in the image ($DQE=(SNR_{out})^2/(SNR_{in})^2$). Therefore, the improvements in image performance of the present invention are significant in improving the early detection of breast cancers.

The invention is designed to replace both the anti-scatter grid and x-ray screen in conventional x-ray systems, and can be coupled to a digital light sensor to function as a complete digital radiographic or mammographic detector system.

Furthermore, the present invention allows greater detector thickness, and hence better absorption efficiency, than prior devices without the loss in spatial resolution because light-reflecting septa are used to collimate and redirect the emitted visible light towards the imaging surface without lateral spread. Because the light will not spread, spatial resolution is increased. In addition, the invention exhibits higher conversion efficiency than prior devices; thus more of the light that is emitted in the detector reaches the imaging surface to be detected by a digital photodetector camera. This combined increase in both absorption efficiency and conversion efficiency leads to an x-ray detector capable of superior imaging performance (a higher frequency-dependent quantum detection efficiency, QDE(f)) than a conventional intensifying screen. Further, this improvement means that very faint anatomical abnormalities can be seen on the image, making the x-ray radiographic examination more sensitive to subtle disease entities, and therefore resulting in more accurate radiographic diagnosis.

An object of the invention is to substantially increase the light photons emitted from a phosphor layer per x-ray absorbed.

Another object of the invention is to improve scatter rejection in x-ray systems.

Another object of the invention is to improve detective quantum efficiency in x-ray systems.

Another object of the invention is to maximize quanta transfer in x-ray systems.

Another object of the invention is to minimize the secondary quanta sink in x-ray systems.

Another object of the invention is to increase the conversion efficiency of x-ray screens without significantly degrading spatial resolution.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is embodied in the apparatus generally shown in FIG. 1 through FIG. 5, and in the imaging systems generally shown in FIG. 6 through FIG. 10, where like reference numerals denote like parts. It will be appreciated that the apparatus may vary as to configuration and as to details of the parts without departing from the basic concepts as disclosed herein.

Figure 1:
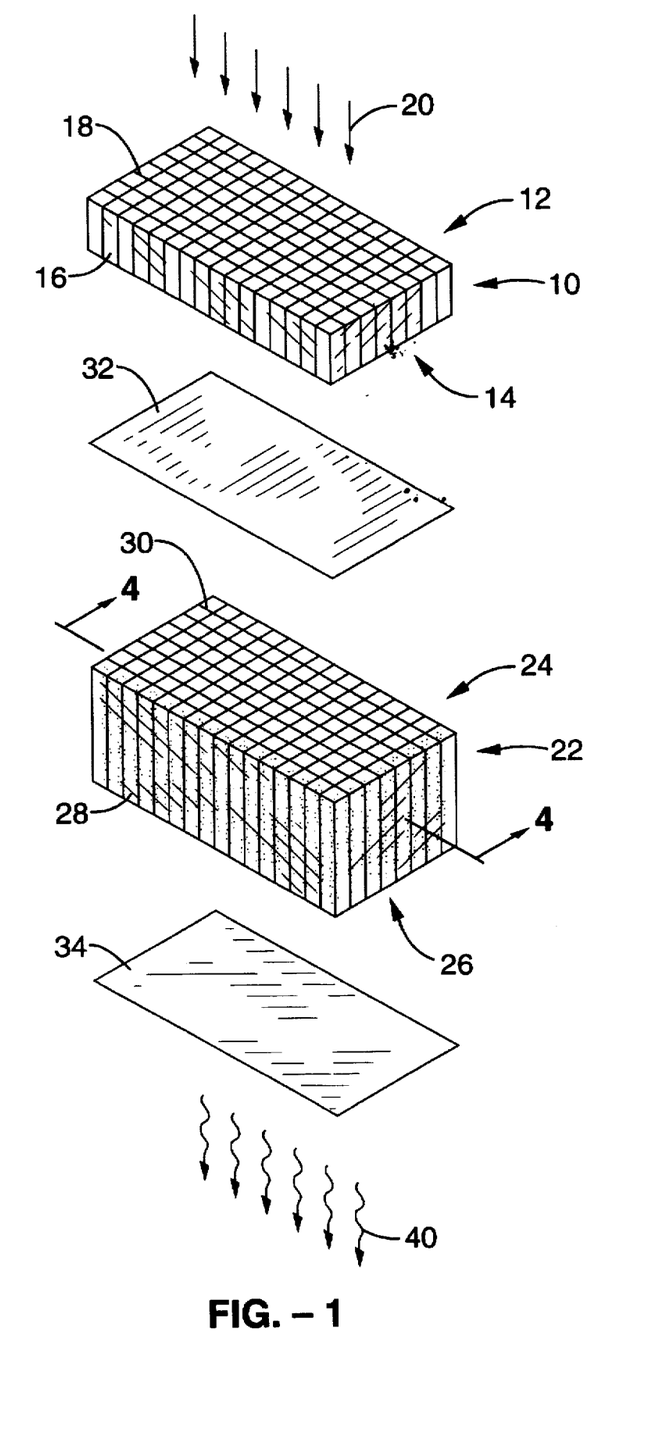
FIG. 1 is an exploded view of a grid-detector apparatus in accordance with the present invention.
Figure 2:
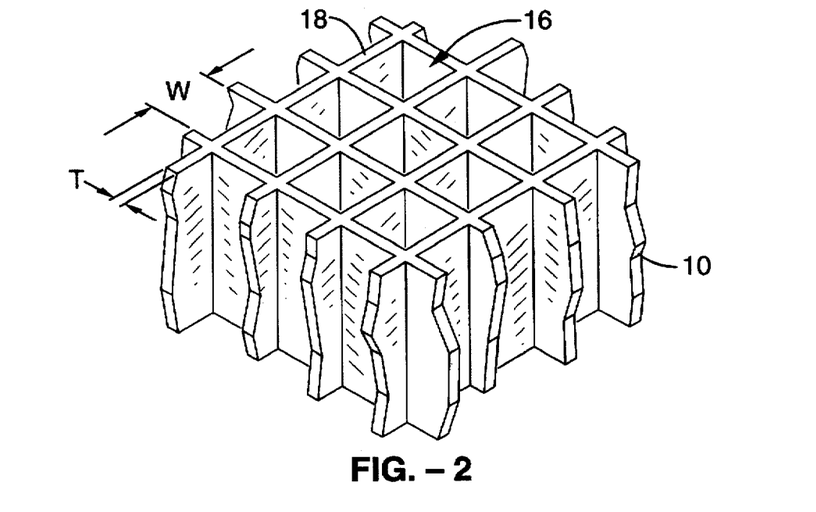
FIG. 2 is an assembled side elevation view of the apparatus shown in FIG. 1.
Figure 3:
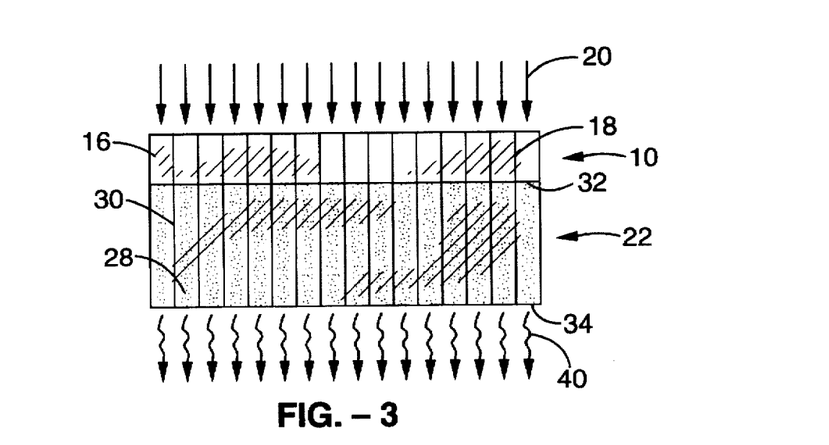
FIG. 3 is a perspective fragmentary view of the air-interspaced grid portion of the apparatus shown in FIG. 1.

Referring first to FIG. 1 through FIG. 3, a grid detector apparatus in accordance with the present invention generally comprises a layered assembly of microchannel plates fabricated from glass containing lead oxide or a like material having a high atomic number which attenuates the transmittal of x-rays therethrough. Each microchannel plate comprises a generally grid-shaped structure with very small channels, or pores, defined by thin walls of the lead glass material. Such microchannel plates can be fabricated to exhibit the characteristics described below, or can be obtained from commercial sources such as Schott Company in Germany and Collimated Holes, Inc., in Santa Barbara, Calif. An example of a grid assembly and method of manufacturing the same suitable for use in the present invention is described in U.S. Pat. No. 5,455,849 entitled "Air-Core Grid For Scattered X-Ray Rejection", issued on Oct. 2, 1995 and assigned to the assignee hereof, which is incorporated by reference herein.

In the embodiment shown, the invention is depicted with a grid pattern of channels having a square cross-section. However, it will be appreciated that the channels could have other cross-sectional shapes, and that the grid pattern could have a hexagonal, triangular, annular or other shape without departing from the present invention. In addition, the microchannel plates may be planar or slightly arcuate so as to allow the channels to point to a small x-ray source spot.

First plate 10 comprises an air-interspaced anti-scatter grid having open first and second sides 12, 14 with a plurality of channels 16 defined by parallel walls 18. It can be seen that channels 16 are oriented so that their longitudinal axis is substantially perpendicular to the plane in which sides 12, 14 lie. In this manner, a structure having adjacent channels is formed wherein the openings in the channels can be oriented toward a source of x-rays 20. First plate 10 is configured such that unscattered x-rays will pass through channels 16 and scattered x-rays will be attenuated when they strike walls 18.

Second plate 22, which comprises a scintillating grid, has an overall physical structure identical to that of first plate 10. Second plate 22 has open first and second sides 24, 26 and a plurality of channels 28. Channels 28, which are aligned with channels 16, are defined by parallel walls 30. Preferably second plate 22 is sandwiched between thin membranes of a material such as mylar or the like. A first membrane 32, positioned between first plate 10 and second plate 22, is preferably a light reflective material that x-rays will penetrate. A second membrane 34, which is positioned on the opposite side of second plate 22 is preferably transparent to light.

Each of the channels 16 is filled with air or the like so that unscattered x-rays can pass through without attenuation. However, as shown in detail in FIG. 4, channels 28 are filled with crystals 36 of a scintillating phosphor material such as $Gd_2O_2S$:Tb, CsI, CsI, Se, $X_2O_2S$:Tb or like efficient x-ray phosphor which is packed as tightly as possible. The remaining spaces between the crystals 36 are then filled with an inert, optical fluid 38 which has an index of refraction matched to that of the phosphor crystals. The refractive index of the optical fluid can vary, but is preferably selected so as to maximize the efficiency of light emission of the device.

Figure 4:
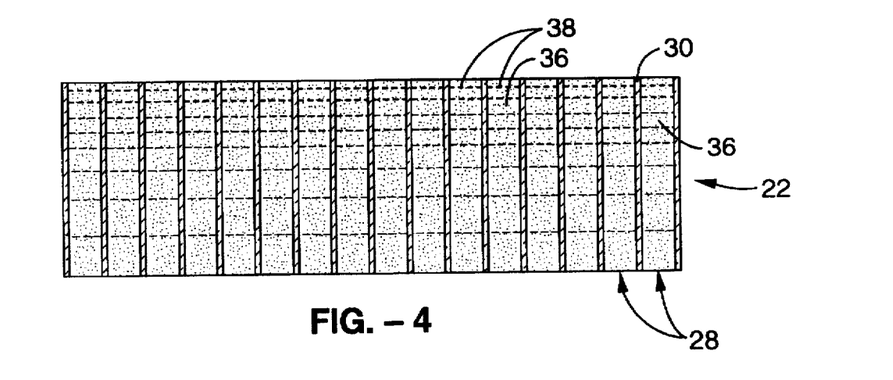
FIG. 4 is a cross-sectional view of a single phosphor/optical fluid filled channel of the apparatus shown in FIG. 1 taken through line 4—4.

As can be seen, therefore, one function of the membranes 32, 34 is to contain this phosphor/optical liquid filling in channels 28. Another function is to seal the phosphor and to prevent possible degradation due to contact with moisture, air, and other contaminants.

Those skilled in the art will appreciate that, instead of a layered assembly of microchannel plates, the present invention could alternatively be fabricated from a single microchannel plate. In this embodiment, each channels would be separated into two contiguous sections, with one section of each channel being air-filled and the other section of each channel being filled with the phosphor and optical fluid. This integrated configuration has the advantage that the channels and walls will be perfectly aligned, with an improvement in DQE since the attenuating septa in the anti-scatter grid will not partially block the channels in the scintillating grid.

Figure 5:
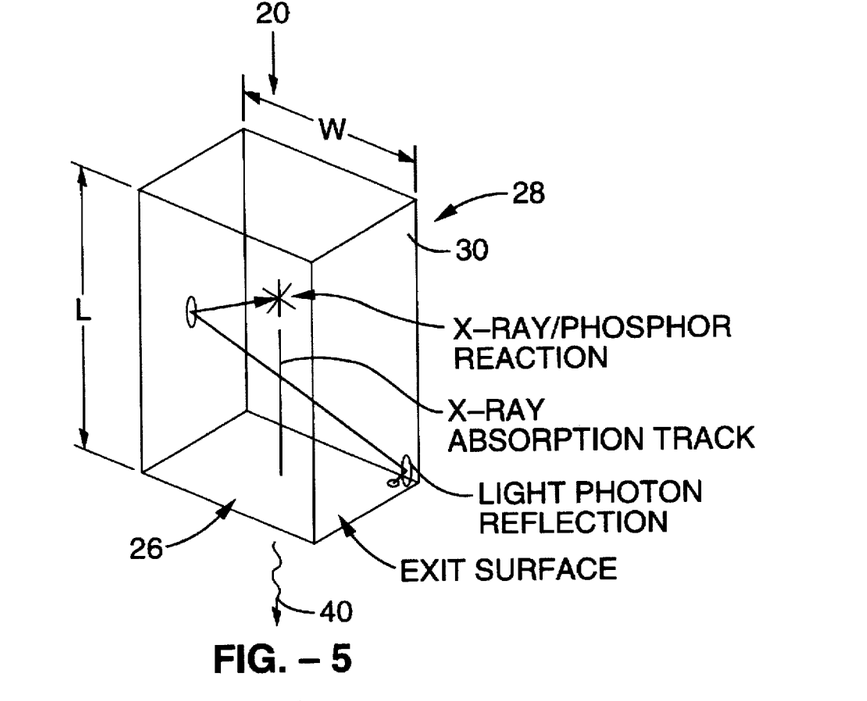
FIG. 5 is a diagrammatic view depicting light propagation through a channel in the present invention.
Figure 6:
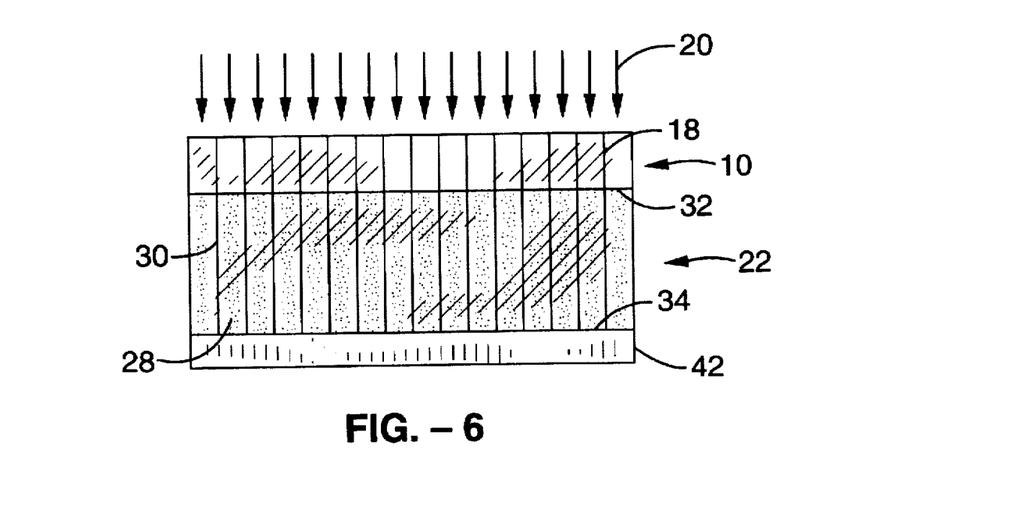
FIG. 6 is an assembled side elevation view of the apparatus shown in FIG. 1 coupled to a light detector.

Referring to FIG. 3 and FIG. 5, it can be seen that each channel comprises a small tube or pore which is separated by very thin septa of the lead-glass or like x-ray attenuating material. The wall thickness T can vary, but is preferably on the order of approximately 5 μm. Thin walls are preferred so as to maximize the cross-sectional area of the channels for a given overall plate size. However, the walls should not be so thin as to permit the penetration of x-ray energy. It will be appreciated that, while the functions of the air-interspaced grid 10 and the scintillating grid 22 are different, the physical structure is the same.

The width W of the channels typically ranges from approximately 20 μm to 200 μm, and length L of the channels (e.g., the thickness of the plates) typically ranges from approximately 0.5 mm to 20 mm, depending upon the particular application. For example, for general radiography the channel width W would typically be on the order of 100 μm and the length L would be on the order of 5 mm to 10 mm for the air interspaced grid and on the order of 10 mm for the scintillating grid. In contrast, for mammography, the channel width W would typically be on the order of 50 μm and the length L would be on the order of 0.5 mm to 2 mm for the air interspaced grid and on the order of 2 mm for the scintillating grid. In this regard, note that the length of the scintillating grid is a function of the density of the phosphor. For example, the length can be expressed in terms of the product of the physical length in cm and the density in $gm/cm^3$. In these terms, for general radiography the preferable thickness would be on the order of 100 $mg/cm^2$ to 400 $mg/cm^2$, and for mammography the preferable thickness would be on the order of 100 $mg/cm^2$.

It will be appreciated that, in mammography, high spatial resolution is desired and low energy x-rays are used (e.g., on the order of 26 kV). There, the goal is to achieve low scattering, high absorption, excellent spatial resolution, and low dosage to the patient. Hence, small pores and thin channels are required. In general radiography, however, higher energy x-rays are used (e.g., on the order of 60 kV to 120 kV) and lower spatial resolution is acceptable. Hence, larger pores and thick plates would be employed. Another consideration with regard to the channel width is the particular resolution needs of the detector used (e.g., size of the CCD pixels). Preferably, the channels should be equal to or smaller than a single detector element in a CCD or like detector.

In operation, the sides of the plates are oriented perpendicular to the direction of the x-rays 20; that is, the longitudinal axis between the ends of the channels (sides of the plates) is aligned with the x-ray source. The x-rays 20 enter channels 16 in first plate 10, which present an open area of approximately eighty percent based on a channel width of approximately 50 μm and septa thickness of approximately 5.9 μm. Scattered x-rays striking the lead-glass septa 18 at an angle are attenuated, whereas the unscattered x-rays pass through channels 16 and first membrane 32, and into channels 28 in second plate 22. Therefore, first plate 10 serves primarily as an anti-scatter grid.

Energy from x-rays striking the phosphor crystals 36 is converted into luminescent energy in channels 28. First membrane 32, being a light reflective material, will prevent light rays from entering into channels 16. Further, the optical fluid 38 reduces the amount of light scattering and absorption in channels 28, and optically couples the light emitted by the phosphor crystals to the opposite end of channels 28 at side 26 of second plate 22. By matching the index of refraction of the optical fluid to that of the phosphor crystals, the propagation distance of the light emitted in the phosphor crystals is increased and, therefore, more of the light will find its way to the end of the channels and be emitted by the detector system of the present invention and captured by the digital photosensor camera. The emitted light 40 can then be coupled to a light detector.

Note that channels 28 exhibit fiberoptic light transmission characteristics. The visible light generated within each channel 28 is reflected by the septa 30 and is focused out through the end of the channels. The result is improved conversion efficiency and brighter output per x-ray photon absorbed than in conventional systems. Further, because the channels are very narrow as described above, the lateral spread of the emitted light is tightly confined, which results in improved spatial resolution. Consequently, the phosphor/optical fluid filled channels 28 can be long and will absorb a much higher fraction of x-rays than conventional systems (e.g., 99% v. 60%). And, not only is the light directed through channels 28, but scattered x-rays are absorbed. As a result, channels 28 also provide an anti-scatter function extending to the light detector, improving scatter rejection and signal to noise ratio of the detector.

Figure 7:
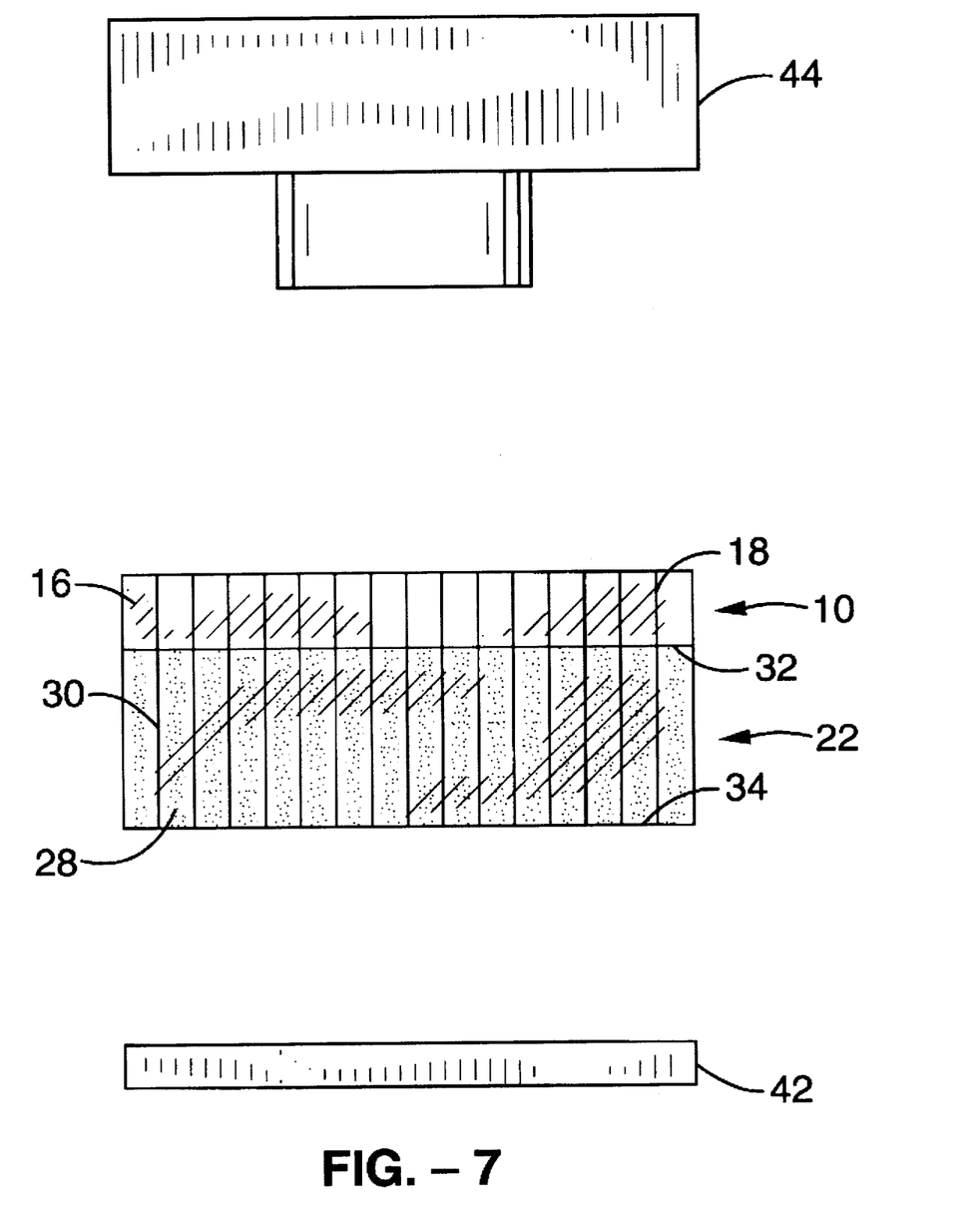
FIG. 7 is a schematic diagram of a transmission mode imaging system employing a grid-detector apparatus in accordance with the present invention.
Figure 8:
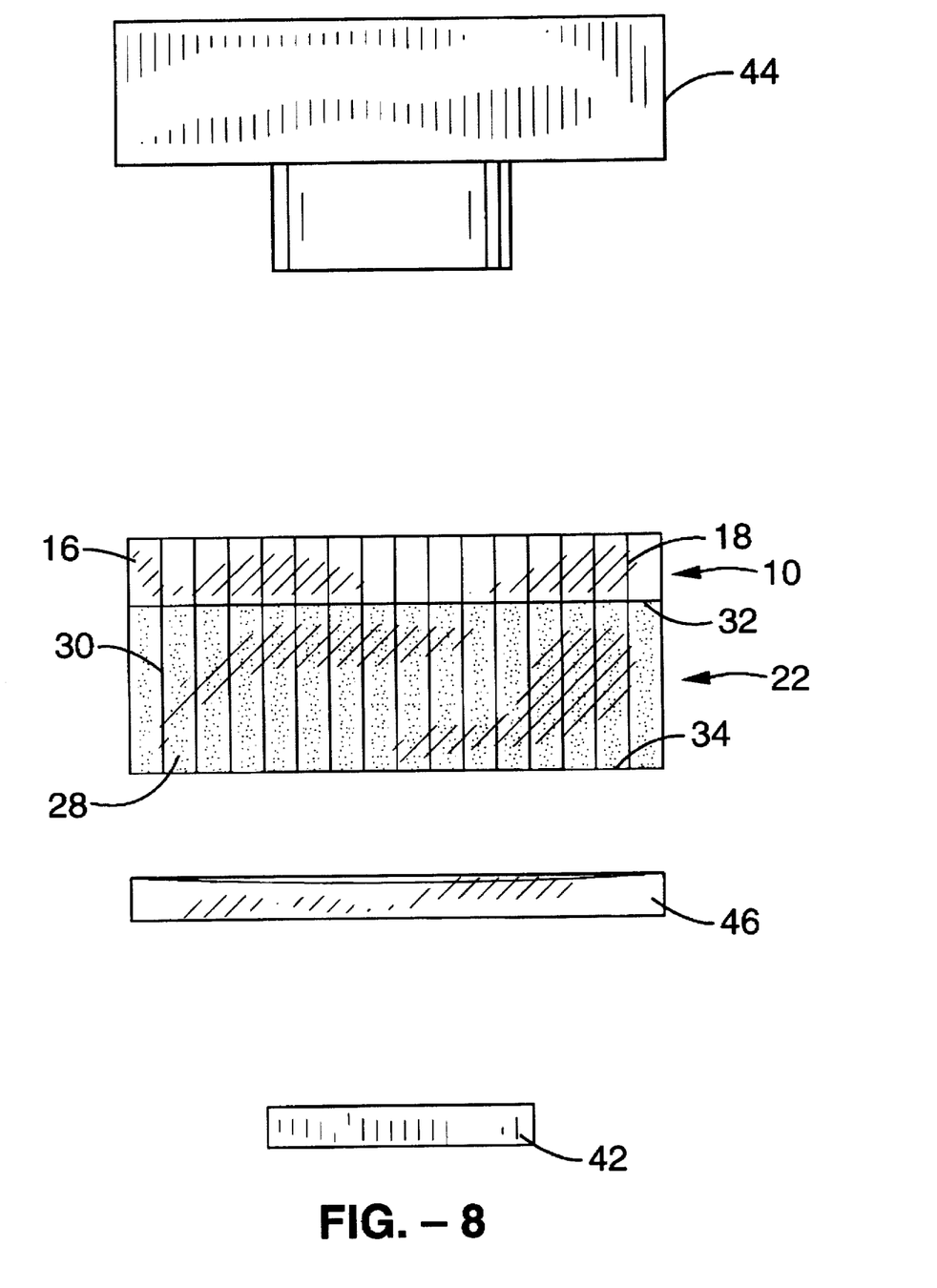
FIG. 8 is a schematic diagram of an alternative embodiment of the system shown in FIG. 7 employing a focusing lens.
Figure 9:
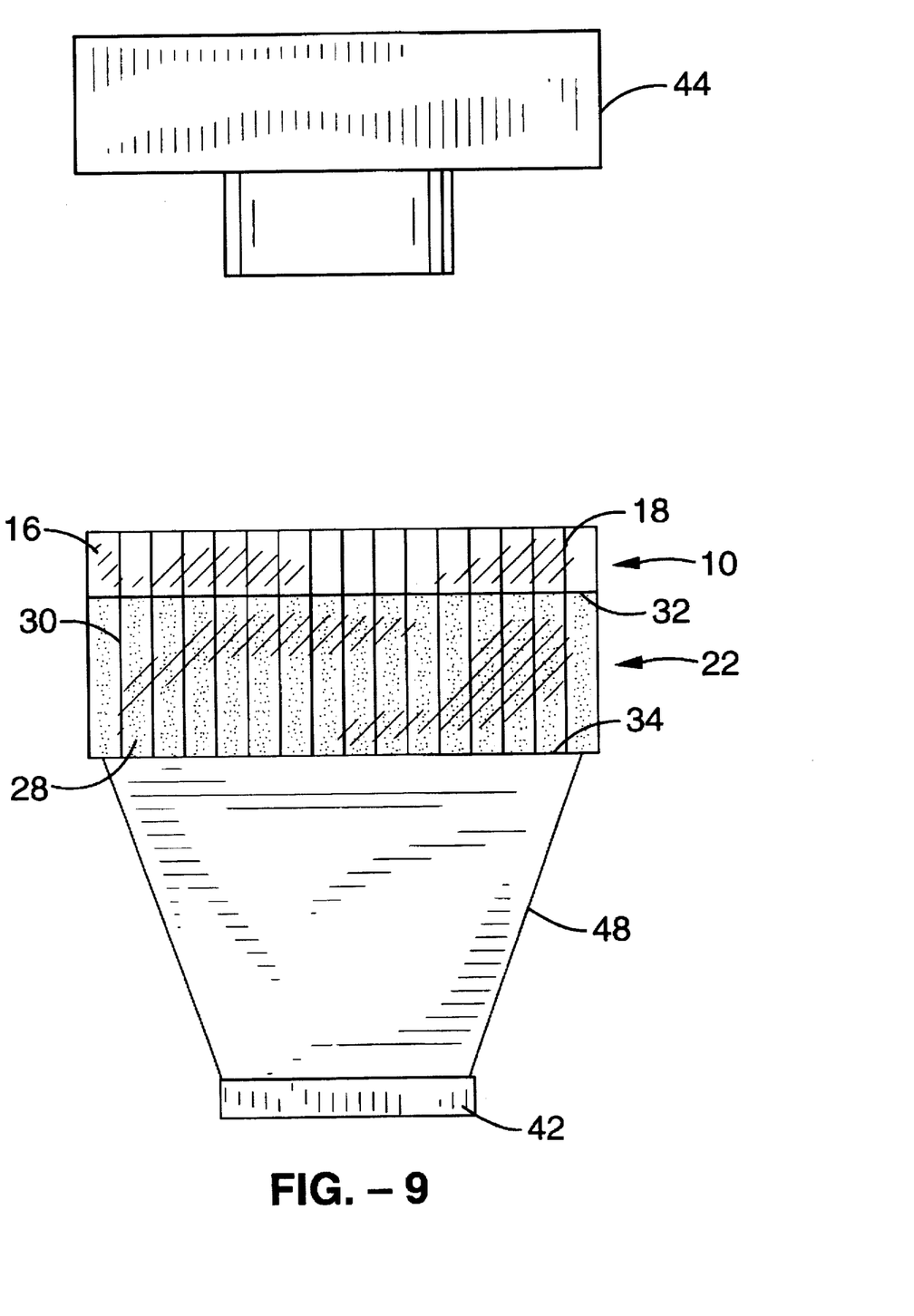
FIG. 9 is a schematic diagram of an alternative embodiment of the system shown in FIG. 7 employing a fiber optic boule reducer.
Figure 10:
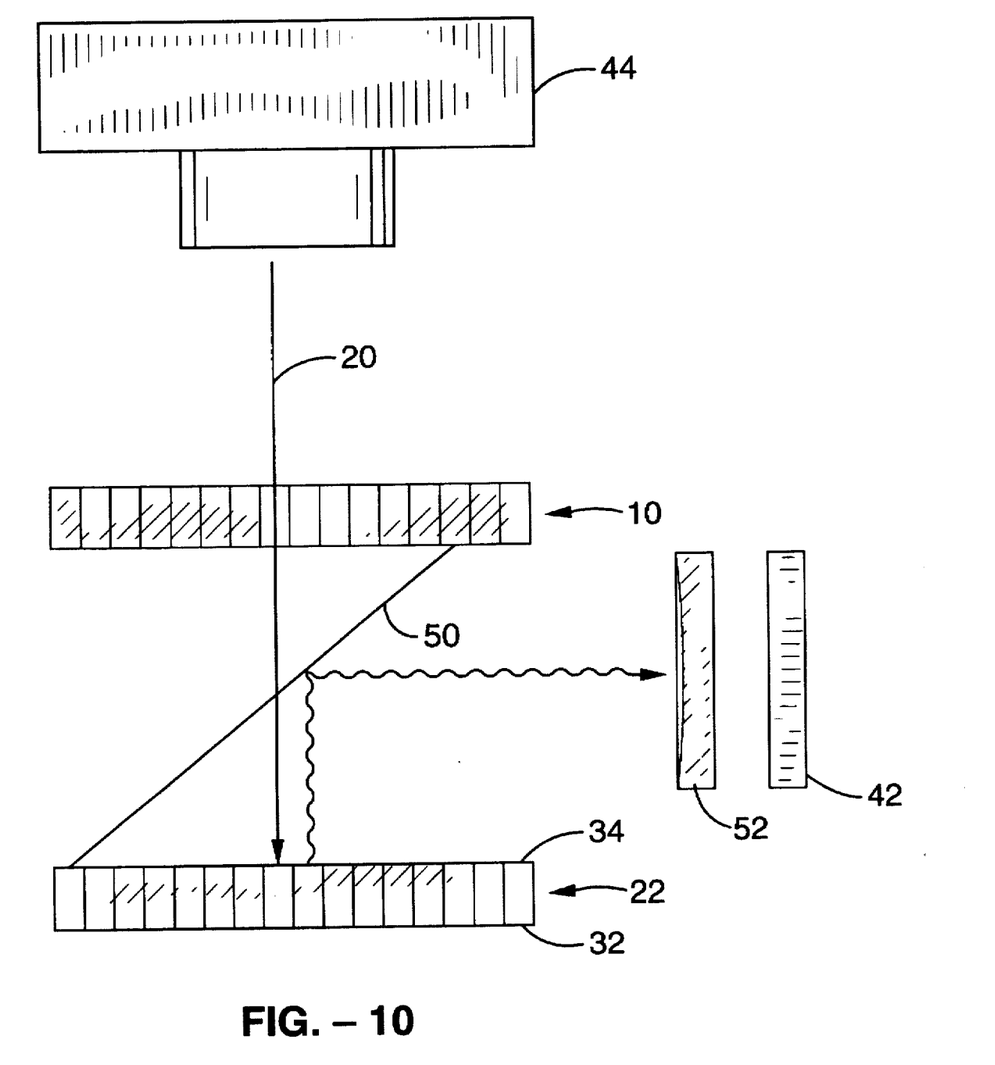
FIG. 10 is a schematic diagram of a reflective mode imaging system employing a grid detector apparatus in accordance with the present invention.

Referring now to FIG. 6 through FIG. 10, a CCD, CMOS camera, silicon photodiode, conventional film detector, lens or other imaging device can be positioned adjacent to, or focused on, the scintillating grid 22 to form a complete image detection apparatus. In the example shown in FIG. 6, first plate 10, second plate 22, first membrane 32, second membrane 34 and a light detector 42 are shown bonded as a multi-layer assembly. In FIG. 7, a complete imaging system is schematically shown which the present invention is positioned between an x-ray source 44 and a light detector 42. While light detector 42 is shown separated from scintillating grid 22, it will be appreciated that the assembly shown in FIG. 6 could be employed as well. FIG. 8 shows an alterative embodiment of the system shown in FIG. 7 wherein a focusing lens 46 is positioned between the light detector 42 and the present invention. Such a configuration would permit the use of a CCD, for example, that is smaller and less costly. In FIG. 9, an alternative embodiment of the system shown in FIG. 7 includes a fiber optic boule reducer 48 positioned between the light detector 42 and the present invention as collimating/focusing device.

In contrast to the various examples of direct mode imaging systems shown in FIG. 7 through FIG. 9, FIG. 10 shows a reflective mode imaging system. Here, plates 10 and 22 are separated as shown and light reflective membrane 50 or the like that can be penetrated by x-rays is positioned at an angle between the two plates. X-rays 20 would pass through the anti-scatter grid 10, through membrane 50, and into the scintillating grid 22. The emitted light would then be reflected by membrane 50 and focused onto light detector 42 through a lens 52.

It will be appreciated that, in each of the embodiments shown, the patient would be positioned between the x-ray source and the present invention. Also, from the foregoing discussion it will be appreciated that other alterative configurations are contemplated for complete imaging systems. For example, instead of a single lens configuration, lens turrets could be employed for selecting a specific lens. Further, a mosaic of CCD's could be employed to reduce light loss.

Accordingly, it will be seen that the present invention comprises an air-interspaced anti-scatter grid and a phosphor/optical fluid filled scintillating grid which, in combination, receive x-rays, attenuate scattered x-rays, convert unscattered x-rays into light energy, and direct that light energy to an imaging sensor with greater efficiency, minimal lateral light spread and increased spatial resolution as compared to conventional systems. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A grid-detector apparatus for x-ray imaging, comprising a plurality of adjacent channels separated by walls comprising glass containing a material of an atomic number capable of attenuating x-rays, said walls having a thickness ranging from approximately 5 µm to approximately 800 µm, said channels having a width ranging from approximately 20 µm to approximately 200 µm, said channels having first and second adjacent sections, said first sections configured to allow passage of x-rays therethrough, said second sections including means for converting x-ray energy into luminescent energy.

2. An apparatus as recited in claim 1, further comprising means for detecting said luminescent energy.

3. An apparatus as recited in claim 1, wherein said means for convening x-ray energy into luminescent energy comprises a scintillating material.

4. An apparatus as recited in claim 3, further comprising an optical fluid mixed with said scintillating material.

5. An apparatus as recited in claim 4, wherein said scintillating material comprises phosphor.

6. A grid-detector apparatus for x-ray imaging, comprising a grid of adjacent channels separated by walls comprising glass containing a material of an atomic number capable of attenuating x-rays, said walls having a thickness ranging from approximately 5 µm to approximately 800 µm, said channels having a width ranging from approximately 20 µm to approximately 200 µm, said channels having first sections configured for passage of x-rays therethrough, said channels having second sections adjacent to said first sections, said second sections containing scintillating material.

7. An apparatus as recited in claim 6, further comprising means for detecting light generated by said x-ray energy interacting with said scintillating material.

8. An apparatus as recited in claim 6, further comprising optical fluid contained in said second sections.

9. An apparatus as recited in claim 8, wherein said scintillating material comprises phosphor.

10. A grid-detector apparatus for x-ray imaging, comprising a structure defining a plurality of channels separated by walls comprising glass containing a material of an atomic number capable of attenuating x-rays, said walls having a thickness ranging from approximately 5 µm to approximately 800 µm, said channels having a width ranging from approximately 20 µm to approximately 200 µm, said structure having first and second sides, said channels having first sections configured for passage of x-rays therethrough, said channels having second sections adjacent to said first sections, said second sections including energy converting means for converting x-ray energy entering said channels from said first side of said grid into luminescent energy and directing said luminescent energy toward said second side of said structure.

11. An apparatus as recited in claim 10, further comprising means for detecting said luminescent energy.

12. An apparatus as recited in claim 10, wherein said energy converting means comprises phosphor.

13. An apparatus as recited in claim 12, wherein said energy converting means further comprises optical fluid mixed with said phosphor.

14. A grid-detector apparatus for x-ray imaging, comprising:
(a) an air interspaced grid; and
(b) a light emitting grid positioned adjacent to said air interspaced grid, said light emitting grid comprising a plurality of cells, said cells including means for converting x-ray energy into luminescent energy;
(c) said air interspaced grid comprising a first wall structure defining a plurality of open spaces therein;
(d) said light emitting grid comprising a second wall structure defining said cells therein;
(e) said first and second wall structures comprising glass containing a material of an atomic number capable of attenuating x-rays;
(f) said first and second wall structures having a wall thickness ranging from approximately 5 µm to approximately 800 µm, said open spaces and said cells having a width ranging from approximately 20 µm to approximately 200 µm.

15. An apparatus as recited in claim 14, further comprising means for detecting said luminescent energy.

16. An apparatus as recited in claim 14, wherein said means for converting x-ray energy into luminescent energy comprises scintillating phosphor.

17. An apparatus as recited in claim 16, wherein said means for converting x-ray energy into luminescent energy further comprises optical fluid mixed with said phosphor.

18. An apparatus as recited in claim 14, further comprising a light reflecting membrane layer positioned between said air interspaced grid and said light emitting grid.

19. An apparatus as recited in claim 18, further comprising a non-reflecting membrane layer positioned adjacent to said light emitting grid distal to said air interspaced grid.

20. A grid-detector apparatus for x-ray imaging, comprising:
(a) an air interspaced grid; and
(b) a light emitting grid positioned adjacent to said air interspaced grid, said light emitting grid having first and second sides, said light emitting grid comprising a plurality of cells, said cells including energy converting means for converting x-ray energy into luminescent energy and directing said luminescent energy toward said second side of said light emitting grid;

(c) said air interspaced grid comprising a first wall structure defining a plurality of open spaces therein;

(d) said light emitting grid comprising a second wall structure defining said cells therein;

(e) said first and second wall structures comprising glass containing a material of an atomic number capable of attenuating x-rays;

(f) said first and second wall structures having a wall thickness ranging from approximately 5 μm to approximately 800 μm, said open spaces and said cells having a width ranging from approximately 20 μm to approximately 200 μm.

21. An apparatus as recited in claim 20, further comprising means for detecting said luminescent energy.

22. An apparatus as recited in claim 20, wherein said energy converting means comprises scintillating phosphor.

23. An apparatus as recited in claim 22, wherein said energy converting means further comprises optical fluid.

24. An apparatus as recited in claim 20, further comprising a light reflecting membrane layer positioned between said air interspaced grid and said light emitting grid.

25. An apparatus as recited in claim 24, further comprising a non-reflecting membrane layer positioned adjacent to said light emitting grid distal to said air interspaced grid.

26. A grid-detector apparatus for x-ray imaging, comprising:

a first microchannel plate having a plurality of air-filled channels;

(b) a second microchannel plate, said second microchannel plate have first and second sides, said first side positioned adjacent to said first microchannel plate, said second microchannel plate having a plurality of phosphor-filled cells;

(c) a reflective membrane layer positioned between said first and second microchannel plates; and (d) a non-reflective membrane layer positioned adjacent said second side of said second microchannel plate;

(e) said first microchannel plate comprising a first wall structure defining said air-filled channels therein;

(f) said second microchannel plate comprising a second wall structure defining said phosphor-filled cells therein;

(g) said first and second wall structures comprising glass containing a material of an atomic number capable of attenuating x-rays;

(h) said first and second wall structures having walls having a thickness ranging from approximately 5 μm to approximately 800 μm, said air-filled cells and said phosphor-filled cells having a width ranging from approximately 20 μm to approximately 200 μm.

27. An apparatus as recited in claim 26, further comprising an image detector positioned adjacent said non-reflective membrane.

28. An apparatus as recited in claim 26, wherein said phosphor-filled cells include optical fluid.

* * * * *